(12) United States Patent
Zhang et al.

(10) Patent No.: US 12,342,389 B2
(45) Date of Patent: Jun. 24, 2025

(54) TIME-OF-ARRIVAL DETERMINATION OF A PRACH PREAMBLE

(71) Applicant: Telefonaktiebolaget LM Ericsson (PUBL), Stockholm (SE)

(72) Inventors: Yang Zhang, Sollentuna (SE); Oskar Mauritz, Johanneshov (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 399 days.

(21) Appl. No.: 17/792,055

(22) PCT Filed: Feb. 12, 2020

(86) PCT No.: PCT/EP2020/053615
§ 371 (c)(1),
(2) Date: Jul. 11, 2022

(87) PCT Pub. No.: WO2021/160258
PCT Pub. Date: Aug. 19, 2021

(65) Prior Publication Data
US 2023/0089771 A1    Mar. 23, 2023

(51) Int. Cl.
*H04W 24/10*     (2009.01)
*H04B 7/024*     (2017.01)
(Continued)

(52) U.S. Cl.
CPC ....... *H04W 74/0841* (2013.01); *H04W 16/28* (2013.01); *H04W 74/0866* (2013.01)

(58) Field of Classification Search
CPC . H04B 7/0695; H04B 7/06952; H04W 72/54; H04W 72/046; H04W 64/003; H04W 72/21; H04W 74/006
(Continued)

(56) References Cited

U.S. PATENT DOCUMENTS

2018/0212659 A1* 7/2018 Xiong ............. H04B 7/0695
2018/0235013 A1  8/2018 Jung et al.
(Continued)

FOREIGN PATENT DOCUMENTS

WO    2018 143892 A1    8/2018

OTHER PUBLICATIONS

3GPP TS 38.211 v15.6.0; Technical Specification; 3rd Generation Partnership Project; Technical Specification Group Radio Access Network; NR; Physical channels and modulation (Release 15)— Jun. 2019.
(Continued)

*Primary Examiner* — Marcus Smith
*Assistant Examiner* — Jason A Harley
(74) *Attorney, Agent, or Firm* — Weisberg I.P. Law, P.A.

(57) ABSTRACT

There is provided mechanisms for determining time-of-arrival of a PRACH preamble. A method is performed by a radio access network node. The radio access network node is configured for beamformed communication in a set of beams. The method comprises receiving, from a UE and at a TRP of the radio access network node, a PRACH preamble. The method comprises determining a weight factor value for the PRACH preamble. The weight factor value is dependent on beam information mapped to the PRACH preamble. The beam information identifies one of the beams in the set of beams. The method comprises determining time-of-arrival of the PRACH preamble using hypothesis testing that incorporates the weight factor value.

19 Claims, 5 Drawing Sheets

(51) Int. Cl.
  *H04B 7/08* (2006.01)
  *H04L 5/00* (2006.01)
  *H04W 16/28* (2009.01)
  *H04W 72/12* (2023.01)
  *H04W 74/08* (2009.01)
  *H04W 74/0833* (2024.01)

(58) Field of Classification Search
  USPC ............................................. 455/456.1
  See application file for complete search history.

(56) References Cited

U.S. PATENT DOCUMENTS

| | | | |
|---|---|---|---|
| 2019/0021076 A1* | 1/2019 | Zhang | H04L 1/1812 |
| 2019/0182852 A1* | 6/2019 | Zhu | H04W 72/51 |
| 2020/0296765 A1* | 9/2020 | Kim | H04W 72/0446 |
| 2021/0176095 A1* | 6/2021 | Manolakos | H04L 25/0226 |
| 2021/0345316 A1* | 11/2021 | Xu | H04W 48/16 |

OTHER PUBLICATIONS

Sinan Gezici et al., A Two-Step Time of Arrival Estimation Algorithm for Impulse Radio Ultra Wideband Systems—May 2008.
3GPP TSG RAN WG1 Meeting #86bis; Lisbon, Portugal; Source: CMCC; Title: RACH in Gradual UE-Specific (GUS) initial access (R1-1609309)—Oct. 10-14, 2016.
3GPP TSG-RAN WG1 Meeting #88; Athens, Greece; Source: Ericsson; Title: NR PRACH design (R1-1702127)—Feb. 13-17, 2017.
PCT International Search Report issued for International application No. PCT/EP2020/053615—Nov. 9, 2020.
Stefania Sesia et al., LTE—The UMTS Long Term Evolution: From Theory to Practice—2009.
PCT Written Opinion of the International Searching Authority issued for International application No. PCT/EP2020/053615—Nov. 9, 2020.

* cited by examiner

TIME-OF-ARRIVAL DETERMINATION OF A PRACH PREAMBLE

PRIORITY

This nonprovisional application is a U.S. National Stage Filing under 35 U.S.C. § 371 of International Patent Application Serial No. PCT/EP2020/053615 filed Feb. 12, 2020 and entitled "TIME-OF-ARRIVAL DETERMINATION OF A PRACH PREAMBLE" which is hereby incorporated by reference in their entirety.

TECHNICAL FIELD

Embodiments presented herein relate to a method, a radio access network node, a computer program, and a computer program product for determining time-of-arrival of a Physical Random Access Channel (PRACH) preamble.

BACKGROUND

In communications networks, there may be a challenge to obtain good performance and capacity for a given communications protocol, its parameters and the physical environment in which the communications network is deployed.

For example, in order to establish an operational connection to the network, a user equipment (UE) performs a random access procedure. An example random access procedure starts with the UE transmitting a Random Access Preamble on a Physical Random Access Channel (for short hereinafter referred to as a PRACH preamble) in a PRACH resource, where which PRACH preamble to use is dependent on system information received from the network. This allows the network to estimate timing of the UE, thus enabling timing alignment.

PRACH preambles in the fifth generation telecommunications system, also denoted New Radio (NR) are generated from Zadoff-Chu sequences. A PRACH preamble consists of one or more periods of the Zadoff-Chu sequence plus a cyclic prefix.

A typical detector of PRACH preambles as employed by a radio access network node in the network comprises a bandpass filter is followed by a bank of correlators adapted for the configured PRACH preamble sequences in the cell served by the radio access network node. The correlator output for different periods, if more than one period, of the periodic preamble may be combined either coherently or non-coherently. In the former case the complex correlator output from the different periods are summed, and in the latter case the power, i.e. the amplitude squared, of the correlator output is summed. Furthermore, the correlator outputs from different receive antennas are added non-coherently.

Once a combined signal is formed from the correlator outputs, a PRACH preamble is considered as detected if the power scaled by the estimated noise power for any sample within the possible range of delays in the combined signal exceeds a threshold power value. The sample with the highest power also gives the estimated time-of-arrival that ideally equals the round-trip time from the antenna of the radio access network node to the antenna of the UE.

The Zadoff-Chu sequences have ideal periodic autocorrelation properties that enables estimation of the time-of-arrival with high accuracy as long as the delay of the signal is within the period T of the PRACH preamble.

Mechanisms to accurately determine the time-of-arrival when the maximum round-trip time exceeds the period of the Zadoff-Chu sequence are generally based on hypothesis testing. For example, two hypotheses H0 and H1 can be formulated as follows.

H0: assume that the time-of-arrival $\tau$ is $\tau=\tau'$, where $0 \leq \tau' < T$.

H1: assume that the time-of-arrival $\tau$ is $\tau=\tau'+T$.

In order to select one of these hypotheses, the energy received for the sample corresponding to $\tau'$ in an early interval is compared with that in a later interval. Denote the energy values for the early and late intervals as $p(\mathcal{I}_{early})$ and $p(\mathcal{I}_{last})$, respectively. If the energy in the early interval $p(\mathcal{I}_{early})$ is larger than that in a later interval $p(\mathcal{I}_{last})$ then H0 is selected, and otherwise H1 is selected. Further, the hypotheses detection might be based on comparing the estimated energy and the measured energy, which resembles a Maximum Likelihood estimator.

In general terms, the cell radius within which the radio access network node provides network access is commonly limited by the PRACH symbol duration no matter how long the PRACH preamble is, because a round trip time equal to the PRACH symbol duration (or any integer multiple thereof) and a round trip time equal to zero will produce the same peak location at the output of the correlator. Assume that the radio access network node is to serve a cell having a comparatively large radius (such as a radius in the order of 4 km) and that this cell is to provide network access in comparatively high frequency bands that have been assigned for NR operation.

Although hypothesis testing approaches designed for cells having comparatively large radii have been devised, it could still be cumbersome to correctly determine the time-of-arrival of the PRACH preamble.

Hence, there is still a need for improved hypothesis testing for determining the time-of-arrival of the PRACH preamble.

SUMMARY

An object of embodiments herein is to provide efficient determination of the time-of-arrival of a PRACH preamble.

According to a first aspect there is presented a method for determining time-of-arrival of a PRACH preamble. The method is performed by a radio access network node. The radio access network node is configured for beamformed communication in a set of beams. The method comprises receiving, from a UE, at a TRP of the radio access network node, a PRACH preamble. The method comprises determining a weight factor value for the PRACH preamble. The weight factor value is dependent on beam information mapped to the PRACH preamble. The beam information identifies one of the beams in the set of beams. The method comprises determining time-of-arrival of the PRACH preamble using hypothesis testing that incorporates the weight factor value.

According to a second aspect there is presented a radio access network node for determining time-of-arrival of a PRACH preamble. The radio access network node is configured for beamformed communication in a set of beams. The radio access network node comprises processing circuitry and a storage medium. The storage medium contains instructions executable by the processing circuitry such that the radio access network node is operative to receive, from a UE, at a TRP of the radio access network node, a PRACH preamble. The storage medium contains instructions executable by the processing circuitry such that the radio access network node is operative to determine a weight factor value for the PRACH preamble. The weight factor value is dependent on beam information mapped to the PRACH preamble. The beam information identifies one of the beams in the set of beams. The storage medium contains instructions executable by the processing circuitry such that the radio access network node is operative to determine time-of-arrival of the PRACH preamble using hypothesis testing that incorporates the weight factor value.

According to a third aspect there is presented a radio access network node for determining time-of-arrival of a PRACH preamble. The radio access network node is configured for beamformed communication in a set of beams. The radio access network node comprises a receive module configured to receive, from a UE, at a TRP of the radio access network node, a PRACH preamble. The radio access network node comprises a determine module configured to determine a weight factor value for the PRACH preamble, wherein the weight factor value is dependent on beam information mapped to the PRACH preamble. The beam information identifies one of the beams in the set of beams. The radio access network node comprises a determine module configured to determine time-of-arrival of the PRACH preamble using hypothesis testing that incorporates the weight factor value.

According to a fourth aspect there is presented a computer program for determining time-of-arrival of a PRACH preamble, the computer program comprising computer program code which, when run on a radio access network node configured for beamformed communication in a set of beams, causes the radio access network node to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously these aspects provide efficient hypothesis testing for determining the time-of-arrival of the PRACH preamble.

Advantageously these aspects improve the random access performance with at most negligible computation increase at baseband.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise. The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Figure 1:
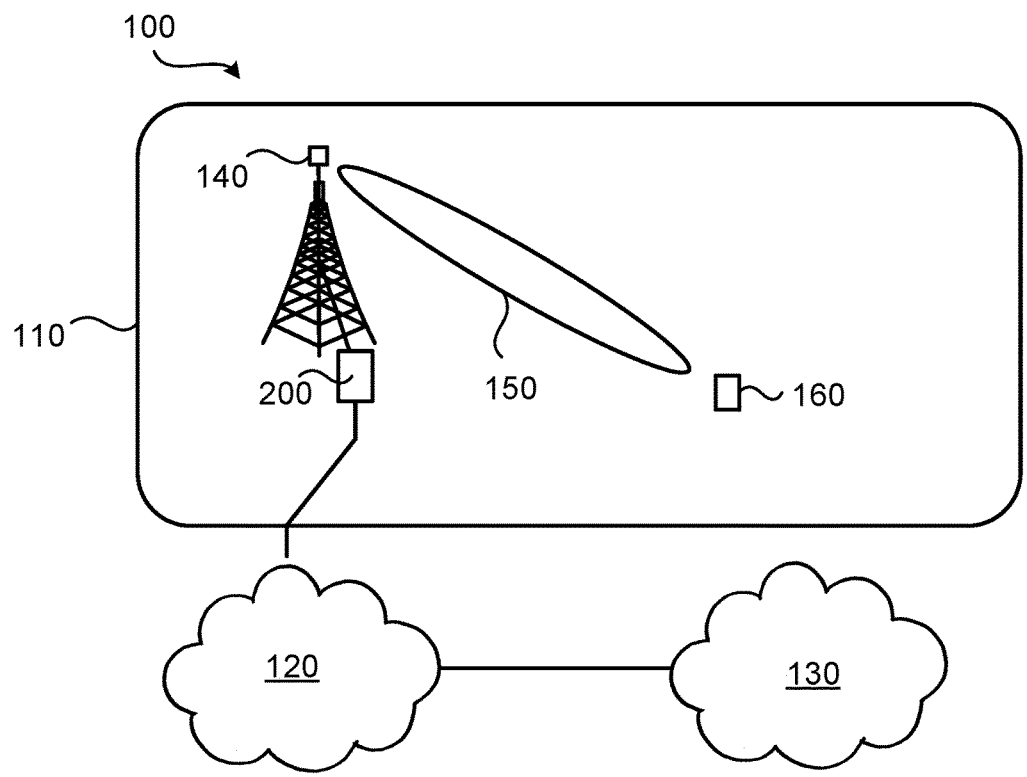
FIG. 1 is a schematic diagram illustrating a communication network according to embodiments.

FIG. 1 is a schematic diagram illustrating a communication network 100 where embodiments presented herein can be applied. The communication network 100 could be a third generation (3G) telecommunications network, a fourth generation (4G) telecommunications network, or a fifth (5G) telecommunications network and support any 3GPP telecommunications standard, where applicable.

The communication network 100 comprises a radio access network node 200 configured to provide network access to a UE 160 in a radio access network 110. The radio access network 110 is operatively connected to a core network 120. The core network 120 is in turn operatively connected to a service network 130, such as the Internet. The UE 160 is thereby enabled to, via the network node 200, access services of, and exchange data with, the service network 130.

The radio access network node 200 comprises, is collocated with, is integrated with, or is in operational communications with, a Transmit and Receive Point (TRP) 140. The radio access network node 200 (via its TRP 140) and the UE 160 are configured to communicate with each other in beams, one of which is identified at reference numeral 150.

Examples of radio access network nodes 200 are radio base stations, base transceiver stations, Node Bs, evolved Node Bs, g NBs, access points, access nodes, and backhaul nodes. Examples of UEs 160 are wireless devices, mobile stations, mobile phones, handsets, wireless local loop phones, smartphones, laptop computers, tablet computers, network equipped sensors, network equipped vehicles, and so-called Internet of Things devices.

Hence, there is still a need for improved hypothesis testing for determining the time-of-arrival of the PRACH preamble.

As noted above, there is still a need for improved hypothesis testing for determining the time-of-arrival of the PRACH preamble.

In further detail, to detect a time-of-arrival longer than one PRACH symbol duration, existing hypothesis testing approaches make hypotheses on the integer number of symbols in the time-of-arrival, and check the hypotheses against the observed signal.

The embodiments disclosed herein relate to mechanisms for determining time-of-arrival of a PRACH preamble. In order to obtain such mechanisms there is provided a radio access network node 200, a method performed by the radio access network node 200, a computer program product comprising code, for example in the form of a computer program, that when run on a radio access network node 200, causes the radio access network node 200 to perform the method.

Figure 2:
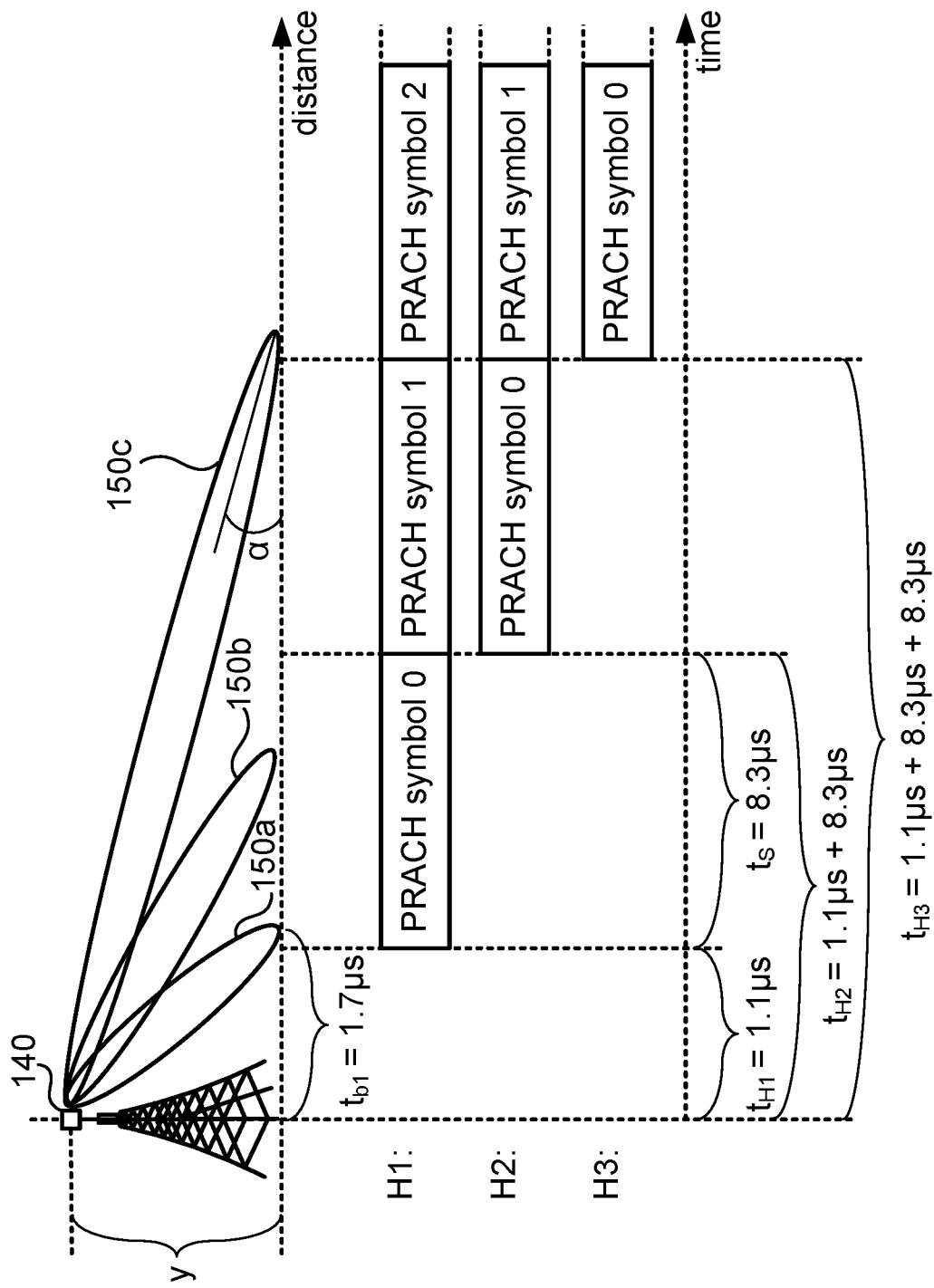
FIG. 2 schematically illustrates part of the communication network in FIG. 1 according to an embodiment.

The herein disclosed hypothesis testing makes use of time domain signal properties as well as spatial domain signal properties (such as beam information). FIG. 2 schematically illustrates the TRP 140 of FIG. 1 and beams 150a, 150b, 150c generated by the TRP 140. The TRP 140 is assumed to be located at an antenna height y. Conversion between distance and time can be made by assuming that the signals travel by the speed of light. In the illustrative example of FIG. 2 there are three hypotheses; H1, H2 and H3. The hypotheses are different from each other with respect to number of integer PRACH symbol lengths. The PRACH symbol length is $t_s$=8.3 μs. For hypothesis Hx the propagation delay value is $t_{Hx}$ for x∈{1, 2, 3}. The propagation delay value $t_{Hx}$ is an integer number of the PRACH symbol length as offset by the estimated propagation delay $t_h$=1.1 μs. That is, $t_{Hx}=t_h+(x-1)\cdot t_s$. Thus, $t_{H1}=t_h+(1-1)\cdot t_s=t_h=1.1$ μs, etc. If beam 150a gives the best received signal, then the propagation time value $t_b$ should be close to $t_{b1}$=1.7 μs. That is, the cost function value should be significantly lower for H1 than for both H2 and H3.

Figure 3:
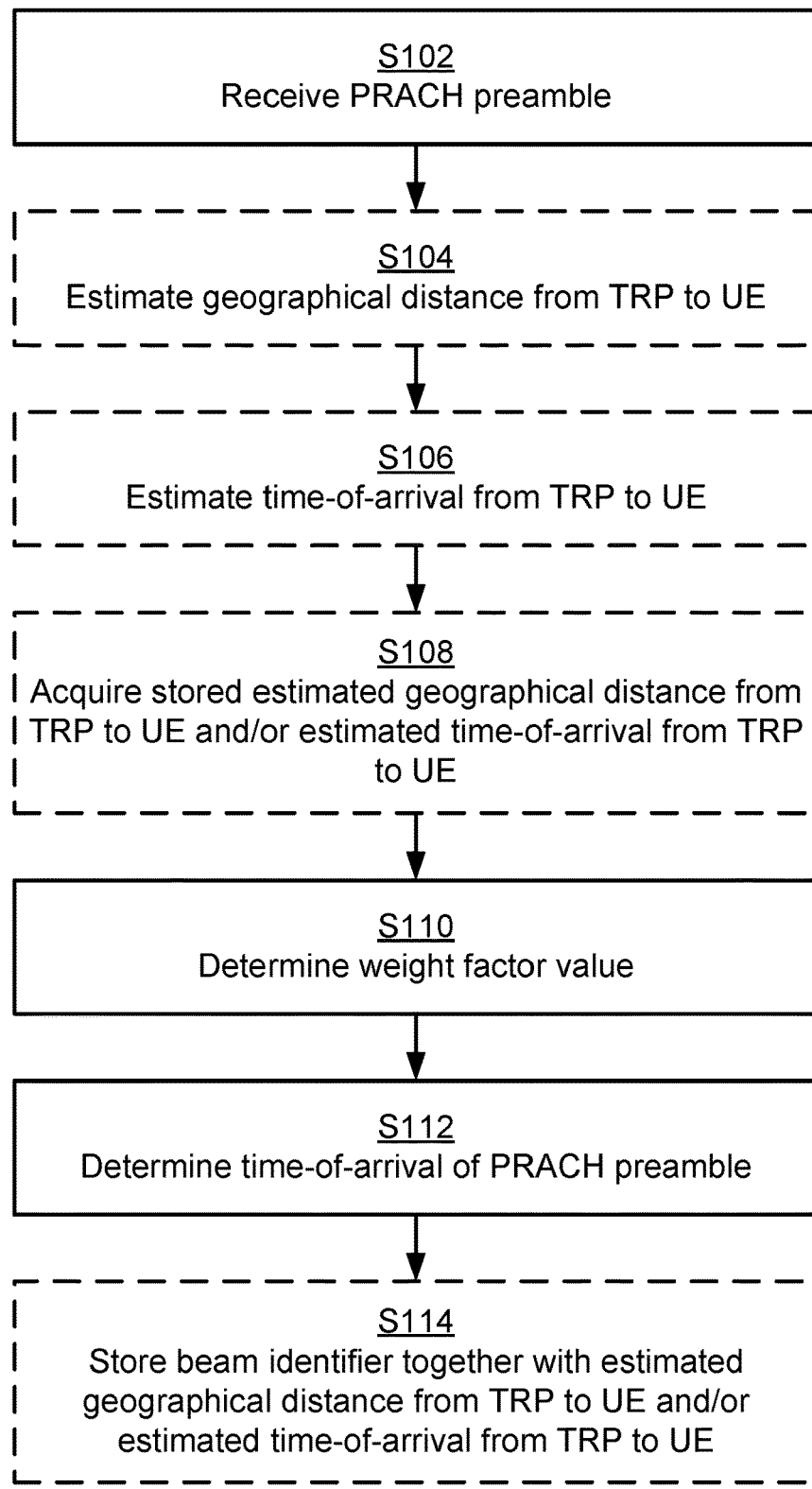
FIG. 3 is a flowchart of methods according to embodiments.

FIG. 3 is a flowchart illustrating embodiments of methods for determining time-of-arrival of a PRACH preamble. The methods are performed by the radio access network node 200. The radio access network node 200 is configured for beamformed communication in a set of beams 150, 150a, 150b, 150c. The methods are advantageously provided as computer programs 620.

It is assumed that the radio access network node 200, via its TRP 140, receives a PRACH preamble. That is, the radio access network node 200 is configured to perform action S102:

S102: The radio access network node 200 receives, from a UE 160 and at a TRP 140 of the radio access network node 200, a PRACH preamble.

Beam information is utilized in order to improve the determination of the time-of-arrival of the PRACH preamble. The beam information is used to determine a weight factor. In particular, the radio access network node 200 is configured to perform action Silo:

Silo: The radio access network node 200 determines a weight factor value for the PRACH preamble. The weight factor value is dependent on beam information mapped to the PRACH preamble. The beam information identifies one of the beams in the set of beams 150, 150a, 150b, 150c. Examples of such beam information will be provided below.

The time-of-arrival of the PRACH preamble is then determined based on the weight factor.

S112: The radio access network node 200 determines time-of-arrival of the PRACH preamble using hypothesis testing that incorporates the weight factor value.

Embodiments relating to further details of determining time-of-arrival of a PRACH preamble as performed by the radio access network node 200 will now be disclosed.

There may be different examples of beam information. The beam information might be based on beams used by the radio access network node 200 for uplink reception at the TRP 140 or for downlink transmission from the TRP 140.

In some aspects, the beam information is defined by the beam in which the PRACH preamble was received from the UE 160. That is, according to an embodiment, the beam information is mapped to the PRACH preamble by indicating the beam in which the PRACH preamble was received at the TRP 140.

In other aspects, the beam information is based on measurements performed by the UE 160 on signals transmitted in the beams 150, 150a, 150b, 150c from the TRP 140, and where the signal in each beam corresponds to a particular PRACH preamble. The Hence, upon having performed measurements on the signals in the beams 150, 150a, 150b, 150c the UE 160 selects the PRACH preamble which corresponds to the beam having highest received power, such as reference signal received power, or other metric. That is, according to an embodiment, the beam information is mapped to the PRACH preamble by indicating the beam in which a reference signal as transmitted by the TRP 140 was received with highest quality by the UE 160. Since there is a one-to-one (e.g. predetermined or predefined) mapping between beams and PRACH preambles the radio access network node 200 thus immediately knows which of the beams 150, 150a, 150b, 150c was selected by the UE 160. Synchronization signal blocks (SSBs) are examples of such signals that are transmitted in beams and where the SSB in each beam identifies its own PRACH preamble to be used by the UE 160.

Further aspects of how the weight factor value might be determined will be disclosed next.

In some aspects, the geographical distance between the TRP 140 and the UE 160 is taken into account when determining the weight factor value. In particular, in some embodiments, the radio access network node 200 is configured to perform (optional) action S104:

S104: The radio access network node 200 estimates geographical distance from the TRP 140 to the UE 160. The geographical distance is then dependent on the beam 150, 150a, 150b, 150c as specified by the beam information and vertical elevation h of the TRP 140 with respect to ground level. The weight factor value is then dependent on the estimated geographical distance.

In some aspects, the time-of-arrival from the TRP 140 to the UE 160 is taken into account when determining the weight factor value. In particular, in some embodiments, the radio access network node 200 is configured to perform (optional) action S106:

S106: The radio access network node 200 estimates time-of-arrival from the TRP 140 to the UE 160. The time-of-arrival to the UE 160 is then dependent on the beam 150, 150a, 150b, 150c as specified by the beam information and vertical elevation h of the TRP 140 with respect to ground level. The weight factor value is then dependent on the estimated time-of-arrival to the UE 160.

In some aspects, the weight factor value is dependent on a beam gain factor. The beam gain factor might be beam specific or common for all beams. In some aspects, each beam 150, 150a, 150b, 150c has its own beam gain factor $w_b$ and the beam gain factor for the beam as specified by the beam information is taken into account when determining the weight factor value. In particular, in some embodiments, each of the beams 150, 150a, 150b, 150c has its own beam gain factor, and the weight factor value is dependent on the beam gain factor of the beam as specified by the beam information. In some embodiments, the beam gain factor is estimated from received power of the PRACH preamble.

This might be the case when the beam information is mapped to the PRACH preamble by defining the beam in which the PRACH preamble was received at the TRP 140. The beam gain factor for the beam specified by the beam information might take the numerical value 1 (or be in the range 0.9 to 1.0) whilst beam gain factor for any other beam might take the numerical value 0 (or be in the range 0.0 to 0.1). However, the numerical value of the beam gain factor might, per beam, change over time and depend on beam quality reports from the UE 160.

In some embodiments, the weight factor is dependent on a beam-specific propagation time value $t_b$ of the beam as specified by the beam information. The beam-specific propagation time value might thus be the estimated propagation time derived from the beam information indicated by UE 160 or the beam(s) used at the TRP 140 for receiving the PRACH preamble. Propagation delay information can be derived from the vertical angle of the beam(s) and the antenna height. In some embodiments, each beam-specific propagation time value has its own beam-specific confidence factor value $\sigma_t^2$, and the weight factor value is dependent on the beam-specific confidence factor value of the beam as specified by the beam information. The beam-specific confidence factor value thus indicates the reliability of beam-specific propagation time value. The beam-specific confidence factor value can be calculated as the variance of all observed propagation times from the beam.

In some embodiments, the weight factor value, per hypothesis, is dependent on a hypothesis-specific propagation delay value $t_h$. The hypothesis-specific propagation delay value is based on the estimated time-of-arrival to the UE 160.

All hypothesis-specific propagation delay values have the same offset value and each hypothesis-specific propagation delay value has its own delay value. The offset value is given by the estimated time-of-arrival to the UE 160. The delay value is given in terms of a respective integer number of PRACH symbol times. That is, the time-of-arrival for the PRACH preamble is determined as the hypothesis-specific propagation delay value for the selected hypothesis. Propagation delay value $t_h$ is the estimated propagation delay value based on the estimated time-of-arrival to the UE 160 and hypothesis h (where in the example of FIG. 2, h thus is either H1, H2, or H3). This is illustrated in the example of FIG. 2, where $t_{H1}=1.1$ μs, $t_{H2}=9.4$ μs, and $t_{H3}=17.7$ μs all share the same offset value given by the estimated propagation delay $t_{H1}=1.1$ μs.

In some embodiments, the weight factor value, per hypothesis, is dependent on a difference, for example the squared distance $(t_h-t_b)^2$, between the hypothesis-specific propagation delay value and the beam-specific propagation time value.

For example, let $C_h$ be a cost function for selecting hypothesis h. Let further $C_{hb}$ be the weight factor value for beam b and for selecting hypothesis h. Then, the cost function for selecting hypothesis h as dependent on the weight factor value $C_{hb}$ can be written as:

$$C_h'=C_{hb}+C_h.$$

In some examples, $$C_{hb} = w_b \frac{(t_h - t_b)^2}{\sigma_t^2}.$$

Further, let $\tilde{p}(i)$ be the measured normalized power in interval i, let $\bar{p}_h(i)$ be the expected normalized peak energy in interval i for hypothesis h, and let $S_h(i)$ be a scale factor that takes the variation of $p_h(i)$ due to noise into account. Then, in some examples, $$C_h = \sum_{i=1}^{N_i} S_h(i)(\bar{p}_h(i) - \hat{p}(i))^2.$$

Thus, when also taking into account the weight factor value $C_{hb}$, the expression for $C_h'$ becomes:

$$C_h' = w_b \frac{(t_h - t_b)^2}{\sigma_c^2} + \sum_{i=1}^{N_i} S_h(i)(\bar{p}_h(i) - \hat{p}(i))^2.$$

Hence, the new cost function $C_h'$ combines time domain information and spatial domain information, and therefore minimization of $C_h'$ might yield more reliable hypothesis decision than minimization of $C_h$. The hypothesis $H_{\hat{h}}$ that minimizes the cost function $C_h'$ is then selected:

$$\hat{h} = \underset{h}{\mathrm{argmin}} C'(h)$$

and the time-of-arrival is estimated as $\tau=\tau'+\hat{h}T$.

In general terms, the hypothesis testing might involve selecting from at least two hypotheses. However, as will be disclosed below, there might be scenarios where the hypothesis testing involves selecting from just a single hypothesis. Thus, in some embodiments, the hypothesis testing involves selecting from at least two hypotheses, where each hypothesis yields its own estimate of the time-of-arrival in terms of amount of integer time-wise symbol lengths of the PRACH preamble. In some embodiments, one weight factor value is determined for each of the at least two hypotheses.

In some embodiments, the hypothesis testing involves determining the time-of-arrival of the PRACH preamble using only information about the geographical distance from the TRP 140 to the UE 160 or the time-of-arrival from the TRP 140 to the UE 160. This represents a scenario where the hypothesis testing involves selecting from just a single hypothesis. With reference to FIG. 2, for example when the beam vertical angle α is large enough, the decision to select H3 as the correct hypothesis can be made directly without involving time-of-arrival based hypothesis testing.

Parameters used during hypothesis testing that leads to a successful random access procedure for the UE 160 might be stored for later use. Particularly, in some embodiments, the radio access network node 200 is configured to perform (optional) action S114:

S114: The radio access network node 200 stores an identifier of the beam as specified by the beam information together with the geographical distance from the TRP 140 to the UE 160 and/or the time-of-arrival from the TRP 140 to the UE 160.

For example, action S114 might be performed after a successful random access procedure. This might be the case when the geographical distance from the TRP 140 to the UE 160 and/or the time-of-arrival from the TRP 140 to the UE 160 was used to determine the time-of-arrival of the PRACH preamble in a successful random access procedure for the UE 160.

Action S114 can be used as part of a self-learning mechanism to efficiently build a mapping of the relation between identifiers of the beams as specified by the beam information together with the geographical distances from the TRP 140 to the UE 160 and/or the time-of-arrivals from the TRP 140 to the UE 160 for different scenarios. For example, if a certain statistical significant level can be achieved on the distribution of the time-of-arrival for a certain beam for all PRACH occasion associated with that beam, this mapping can be used for subsequent hypothesis testing.

Previously stored parameters from previous successful random access procedures might, for example, be used when only poor estimates of the geographical distance from the TRP 140 to the UE 160 and/or of the time-of-arrival from the TRP 140 to the UE 160 are available, for example because of cabling delay or measurement error, or because the exact beam angle and antenna height are not known. In some embodiments, the radio access network node 200 is thus configured to perform (optional) action S108:

S108: The radio access network node 200 acquires previously stored value of the geographical distance from the TRP 140 to the UE 160 and/or of the time-of-arrival from the TRP 140 to the UE 160 for the beam as specified by the beam information for determining the weight factor value.

In some embodiments, the previously stored value of the geographical distance from the TRP 140 to the UE 160 and/or of the time-of-arrival from the TRP 140 to the UE 160 for the beam as specified by the beam information is acquired only when the geographical distance from the TRP 140 to the UE 160 and/or of the time-of-arrival from the TRP 140 to the UE 160 cannot be successfully estimated.

It is thus noted that for one and the same random access procedure, both actions S108 and S114 are not performed.

Figure 4:
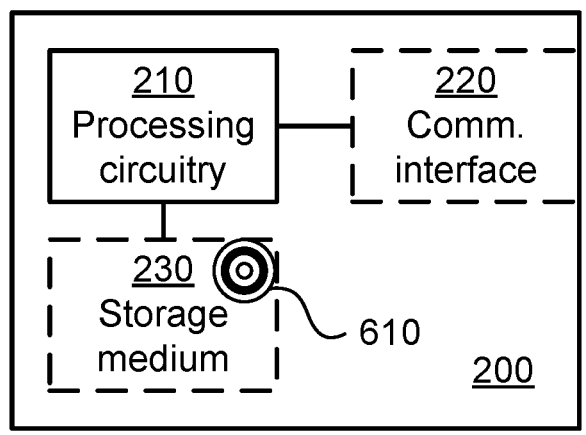
FIG. 4 is a schematic diagram showing functional units of a radio access network node according to an embodiment.

FIG. 4 schematically illustrates, in terms of a number of functional units, the components of a radio access network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 610 (as in FIG. 6), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio access network node 200 to perform a set of operations, or actions, as disclosed above. For example, the storage medium 230 may store the set of operations, and the processing circuitry 210 may be configured to retrieve the set of operations from the storage medium 230 to cause the radio access network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio access network node 200 may further comprise a communications interface 220 at least configured for communications with components of the core network 120 and the UE 160 via its TRP 140. As such the communications interface 220 may comprise one or more transmitters and receivers, comprising analogue and digital components. In some examples, the TRP 140 is part of the communications interface 220.

The processing circuitry 210 controls the general operation of the radio access network node 200 e.g. by sending data and control signals to the communications interface 220 and the storage medium 230, by receiving data and reports from the communications interface 220, and by retrieving data and instructions from the storage medium 230. Other components, as well as the related functionality, of the radio access network node 200 are omitted in order not to obscure the concepts presented herein.

Figure 5:
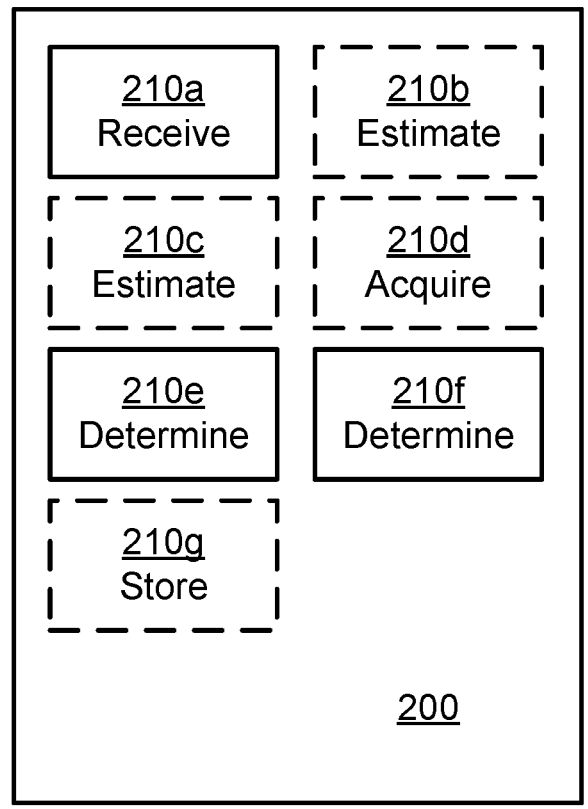
FIG. 5 is a schematic diagram showing functional modules of a radio access network node according to an embodiment.

FIG. 5 schematically illustrates, in terms of a number of functional modules, the components of a radio access network node 200 according to an embodiment. The radio access network node 200 of FIG. 5 comprises a number of functional modules; a receive module 210a configured to perform action S102, a first determine module 210e configured to perform action Si1o, and a second determine module 210f configured to perform action S112. The radio access network node 200 of FIG. 5 may further comprise a number of optional functional modules, such as any of a first estimate module 210b configured to perform action S104, a second estimate module 210C configured to perform action S106, an acquire module 210d configured to perform action S108, and a store module 210g configured to perform action S114. In general terms, each functional module 210a-210g may in one embodiment be implemented only in hardware and in another embodiment with the help of software, i.e., the latter embodiment having computer program instructions stored on the storage medium 230 which when run on the processing circuitry makes the radio access network node 200 perform the corresponding actions mentioned above in conjunction with FIG. 5. It should also be mentioned that even though the modules correspond to parts of a computer program, they do not need to be separate modules therein, but the way in which they are implemented in software is dependent on the programming language used. Preferably, one or more or all functional modules 210a-210g may be implemented by the processing circuitry 210, possibly in cooperation with the communications interface 220 and/or the storage medium 230. The processing circuitry 210 may thus be configured to from the storage medium 230 fetch instructions as provided by a functional module 210a-210g and to execute these instructions, thereby performing any actions as disclosed herein.

The radio access network node 200 may be provided as a standalone device or as a part of at least one further device. For example, the radio access network node 200 may be provided in a node of the radio access network or in a node of the core network. Alternatively, functionality of the radio access network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the radio access network node 200 may be executed in a first device, and a second portion of the of the instructions performed by the radio access network node 200 may be executed in a second device; the herein disclosed embodiments are not limited to any particular number of devices on which the instructions performed by the radio access network node 200 may be executed. Hence, the methods according to the herein disclosed embodiments are suitable to be performed by a radio access network node 200 residing in a cloud computational environment. Therefore, although a single processing circuitry 210 is illustrated in FIG. 4 the processing circuitry 210 may be distributed among a plurality of devices, or nodes. The same applies to the functional modules 210a-210g of FIG. 5 and the computer program 620 of FIG. 6.

Figure 6:
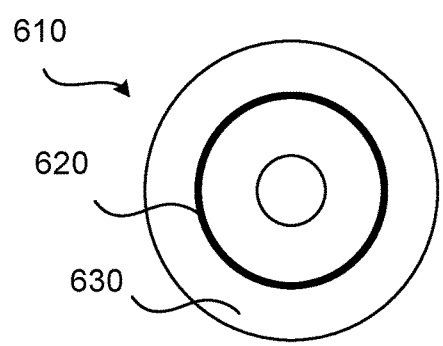
FIG. 6 shows one example of a computer program product comprising computer readable storage medium according to an embodiment.

FIG. 6 shows one example of a computer program product 610 comprising computer readable storage medium 630. On this computer readable storage medium 630, a computer program 620 can be stored, which computer program 620 can cause the processing circuitry 210 and thereto operatively coupled entities and devices, such as the communications interface 220 and the storage medium 230, to execute methods according to embodiments described herein. The computer program 620 and/or computer program product 610 may thus provide means for performing any actions as herein disclosed.

In the example of FIG. 6, the computer program product 610 is illustrated as an optical disc, such as a CD (compact disc) or a DVD (digital versatile disc) or a Blu-Ray disc. The computer program product 610 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 620 is here schematically shown as a track on the depicted optical disk, the computer program 620 can be stored in any way which is suitable for the computer program product 610.

Figure 7:
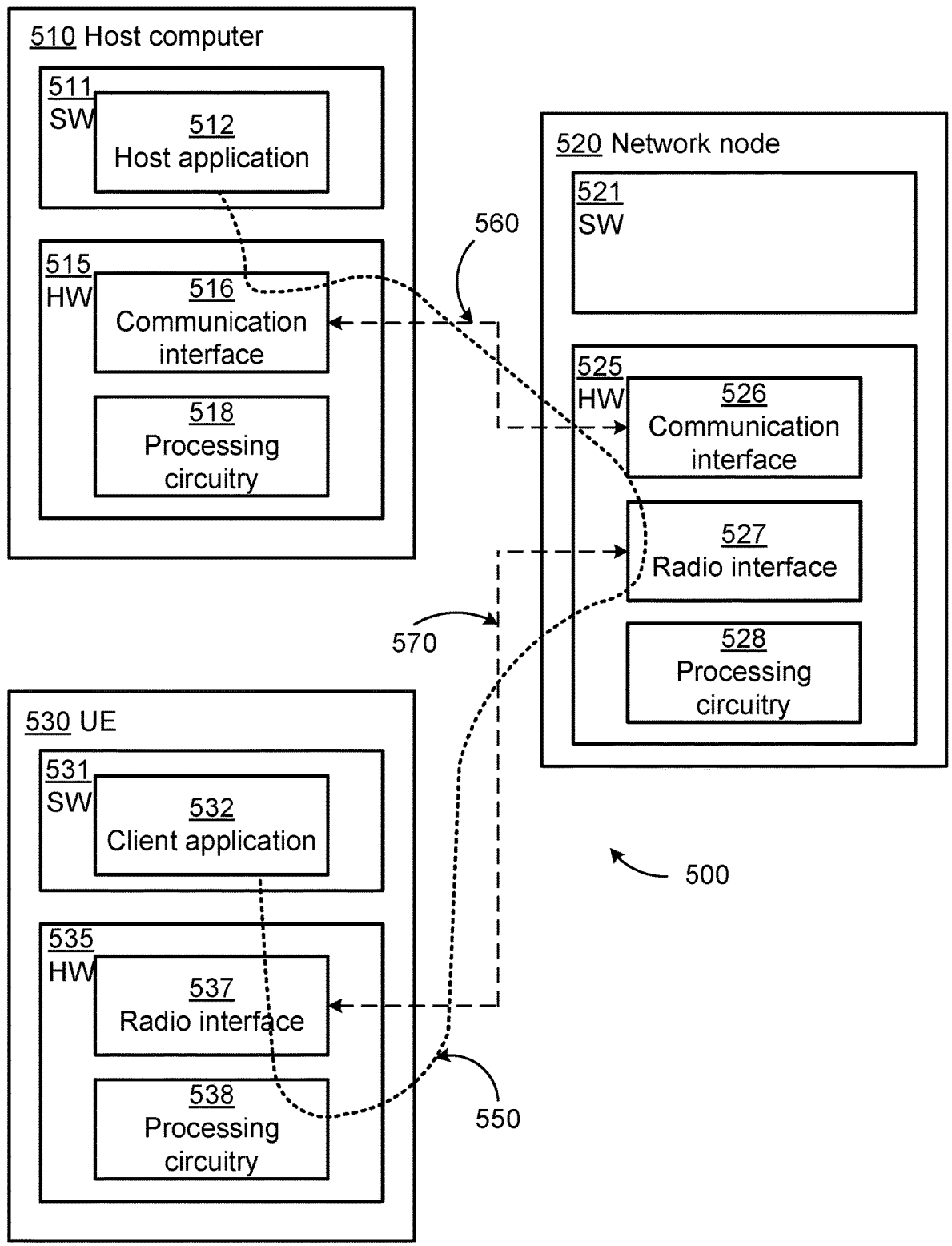
FIG. 7 is a schematic diagram illustrating host computer communicating via a radio base station with a UE over a partially wireless connection in accordance with some embodiments.

FIG. 7 is a schematic diagram illustrating host computer communicating via a radio access network node with a UE over a partially wireless connection in accordance with some embodiments. Example implementations, in accordance with an embodiment, of the UE, radio access network node and host computer discussed in the preceding paragraphs will now be described with reference to FIG. 7. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. The UE 530 corresponds to the UE 160 of FIG. 1. In providing the service to the remote user, host application 512 may provide user data which is transmitted using OTT connection 550.

Communication system 500 further includes radio access network node 520 provided in a telecommunication system and comprising hardware 525 enabling it to communicate with host computer 510 and with UE 530. The radio access network node 520 corresponds to the radio access network node 200 of FIG. 1. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 7) served by radio access network node 520. Communication interface 526 may be configured to facilitate connection 560 to host computer 510. Connection 560 may be direct or it may pass through a core network (not shown in FIG. 7) of the telecommunication system and/or through one or more intermediate networks outside the telecommunication system. In the embodiment shown, hardware 525 of radio access network node 520 further includes processing circuitry 528, which may comprise one or more programmable processors, application-specific integrated circuits, field programmable gate arrays or combinations of these (not shown) adapted to execute instructions. Radio access network node 520 further has software 521 stored internally or accessible via an external connection.

Communication system 500 further includes UE 530 already referred to. Its hardware 535 may include radio interface 537 configured to set up and maintain wireless connection 570 with a radio access network node serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 51o. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, radio access network node 520 and UE 530 illustrated in FIG. 7 may be similar or identical to host computer 430, one of network nodes 412a, 412b, 412c and one of UEs 491, 492 of FIG. xxi, respectively. This is to say, the inner workings of these entities may be as shown in FIG. 7 and independently, the surrounding network topology may be that of FIG. xxi.

In FIG. 7, OTT connection 550 has been drawn abstractly to illustrate the communication between host computer 510 and UE 530 via network node 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and radio access network node 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may reduce latency of the content delivered to an end user, reduce jitter, reduce likelihood of frame freezes and frame skips and thereby provide benefits such as improved Quality of Experience of a user consuming real-time streamed media content.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to radio access network node 520. Such procedures and functionalities may be known and practiced in the art. In certain embodiments, measurements may involve proprietary UE signaling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for determining time-of-arrival of a Physical Random Access Channel, PRACH, preamble, the method being performed by a radio access network node, the radio access network node being configured for beamformed communication in a set of beams, the method comprising:
   receiving, from a User Equipment, UE, at a Transmit and Receive Point, TRP, of the radio access network node, a PRACH preamble;
   determining a weight factor value for the PRACH preamble, wherein the weight factor value is dependent on beam information mapped to the PRACH preamble, the beam information identifying one of the beams in the set of beams; and
   determining time-of-arrival of the PRACH preamble using hypothesis testing that incorporates the weight factor value, the hypothesis testing comprising:
      determining a plurality of hypotheses, each having a different respective integer PRACH symbol length;
      calculating, for each hypothesis of the plurality of hypotheses, a respective propagation delay value based on the respective integer PRACH symbol length;
      calculating, for each hypothesis of the plurality of hypotheses, a respective cost using a cost function that is based on the weight factor and the respective propagation delay value; and
      selecting the hypothesis of the plurality of hypotheses with the lowest respective cost.

2. The method according to claim 1, further comprising:
   estimating geographical distance from the TRP to the UE, wherein the geographical distance is dependent on the beam as specified by the beam information and vertical elevation (h) of the TRP with respect to ground level, and wherein the weight factor value is dependent on the estimated geographical distance.

3. The method according to claim 1, further comprising:
   estimating time-of-arrival from the TRP to the UE, wherein the time-of-arrival to the UE is dependent on the beam as specified by the beam information and vertical elevation (h) of the TRP with respect to ground level, and wherein the weight factor value is dependent on the estimated time-of-arrival to the UE.

4. The method according to claim 1, wherein each of the beams has its own beam gain factor, and wherein the weight factor value is dependent on the beam gain factor of the beam as specified by the beam information.

5. The method according to claim 4, wherein the beam gain factor is estimated from received power of the PRACH preamble.

6. The method according to claim 1, wherein the weight factor is dependent on a beam-specific propagation time value of the beam as specified by the beam information.

7. The method according to claim 6, wherein each beam-specific propagation time value has its own beam-specific confidence factor value, and wherein the weight factor value is dependent on the beam-specific confidence factor value of the beam as specified by the beam information.

8. The method according to claim 1, wherein the weight factor value, per hypothesis, is dependent on a hypothesis-specific propagation delay value that is based on the estimated time-of-arrival to the UE.

9. The method according to claim 8, wherein the time-of-arrival for the PRACH preamble is determined as the hypothesis-specific propagation delay value for the selected hypothesis.

10. The method according to claim 6, wherein the weight factor value, per hypothesis, is dependent on a difference between the hypothesis-specific propagation delay value and the beam-specific propagation time value.

11. The method according to claim 1, wherein the hypothesis testing involves selecting from at least two hypotheses, where each hypothesis yields its own estimate of the time-of-arrival in terms of amount of integer time-wise symbol lengths of the PRACH preamble.

12. The method according to claim 11, wherein one weight factor value is determined for each of the at least two hypotheses.

13. The method according to claim 2, wherein the hypothesis testing involves determining the time-of-arrival of the PRACH preamble using only information about the geographical distance from the TRP to the UE or the time-of-arrival from the TRP to the UE.

14. The method according to claim 2, further comprising:
   storing an identifier of the beam as specified by the beam information together with the geographical distance from the TRP to the UE and/or the time-of-arrival from the TRP to the UE.

15. The method according to claim 1, wherein the beam information is mapped to the PRACH preamble by indicating the beam in which the PRACH preamble was received at the TRP (140).

16. The method according to claim 1, wherein the beam information is mapped to the PRACH preamble by indicating the beam in which a reference signal as transmitted by the TRP was received with highest quality by the UE.

17. A radio access network node for determining time-of-arrival of a Physical Random Access Channel, PRACH, preamble, the radio access network node being configured for beamformed communication in a set of beams, the radio access network node comprising processing circuitry and a storage medium, the storage medium containing instructions executable by the processing circuitry such that the radio access network node is operative to:

receive, from a User Equipment, UE, at a Transmit and Receive Point, TRP, of the radio access network node, a PRACH preamble;

determine a weight factor value for the PRACH preamble, wherein the weight factor value is dependent on beam information mapped to the PRACH preamble, the beam information identifying one of the beams in the set of beams; and determine time-of-arrival of the PRACH preamble using hypothesis testing that incorporates the weight factor value, the hypothesis testing comprising:

determining a plurality of hypotheses, each having a different respective integer PRACH symbol length;

calculating, for each hypothesis of the plurality of hypotheses, a respective propagation delay value based on the respective integer PRACH symbol length;

calculating, for each hypothesis of the plurality of hypotheses, a respective cost using a cost function that is based on the weight factor and the respective propagation delay value; and selecting the hypothesis of the plurality of hypotheses with the lowest respective cost.

18. The radio access network node according to claim 17, wherein the radio access network node is further operative to estimate geographical distance from the TRP to the UE, wherein the geographical distance is dependent on the beam as specified by the beam information and vertical elevation (h) of the TRP with respect to ground level, and wherein the weight factor value is dependent on the estimated geographical distance.

19. A non-transitory computer storage medium comprising a computer program for determining time-of-arrival of a Physical Random Access Channel, PRACH, preamble, the computer program comprising computer code which, when run on processing circuitry of a radio access network node configured for beamformed communication in a set of beams, causes the radio access network node to:

receive, from a User Equipment, UE, and at a Transmit and Receive Point, TRP, of the radio access network node, a PRACH preamble;

determine a weight factor value for the PRACH preamble, wherein the weight factor value is dependent on beam information mapped to the PRACH preamble, the beam information identifying one of the beams in the set of beams; and determine time-of-arrival of the PRACH preamble using hypothesis testing that incorporates the weight factor value, the hypothesis testing comprising:

determining a plurality of hypotheses, each having a different respective integer PRACH symbol length;

calculating, for each hypothesis of the plurality of hypotheses, a respective propagation delay value based on the respective integer PRACH symbol length;

calculating, for each hypothesis of the plurality of hypotheses, a respective cost using a cost function that is based on the weight factor and the respective propagation delay value; and selecting the hypothesis of the plurality of hypotheses with the lowest respective cost.

* * * * *